United States Patent Office 3,466,251
Patented Sept. 9, 1969

3,466,251
PROCESS FOR POLYMERIZING AN EPOXY COMPOUND IN THE PRESENCE OF CARBON DIOXIDE
Kenichi Fukui and Tsutomu Kagiya, Kyoto, Hisao Yokota, Kobe, and Misato Horie, Kyoto, Japan, assignors to Sumitomo Chemical Company, Ltd., and Seitetsu Kagaku Co., Ltd., both of Osaka, Japan, both corporations of Japan
No Drawing. Filed Sept. 2, 1966, Ser. No. 576,836
Claims priority, application Japan, Sept. 4, 1965, 40/54,134
Int. Cl. C08g 23/14, 23/06
U.S. Cl. 260—2          3 Claims

ABSTRACT OF THE DISCLOSURE

A process for polymerizing at least one epoxy compound selected from the group consisting of alkylene epoxides, substituted alkylene epoxides, epoxy ethers, styrene epoxide, substituted styrene oxides, butadiene monoepoxide and epoxy stearate with an ionic catalyst free of alkaline earth metals, characterized in that liquid carbon dioxide is used as a part of the entire solvent or dispersion medium, whereby the separation of the produced polymer is facilitated and the process is rendered advantageous from the viewpoint of fire prevention.

---

This invention relates to a novel method for the polymerization of epoxides. More particularly, the invention pertains to a process for the catalytic polymerization of epoxides, characterized in that the polymerization is carried out in the presence of carbon dioxide in weight ratio to monomers of from 0.1 to 100.

It has been well-known that when epoxides, singly or in admixture, are polymerized by use of an ionic catalyst, various polymers are formed due to the ring opening of epoxy groups. These polymers have many uses such as sizes, film-forming materials, viscosity increasing agents, dispersing agents for suspension polymerization and the like, and are markedly useful and are produced on commercial scale. All the above-mentioned polymerization reactions are usually carried out in bulk state or in organic solvents. However, when the reaction is effected on a large scale, the bulk polymerization suffers from such drawback that the polymerization heat generated is so enormous that the polymerization temperature is difficult to control. On the other hand, in the case of the solution polymerization in an organic solvent, the polymer is obtained in the form of a highly viscous solution or of a viscous mass, because of its good dissolution in the solvent present. Therefore, a difficult operation in taking out the product from the polymerization vessel is encountered. Further, the costs due to the recovery loss and purification of the expensive organic solvent occupy a considerable proportion in production costs.

The present inventors found that carbon dioxide is a diluent or solvent useful for the polymerization of epoxides. That is, the inventors discovered the fact that when used in the polymerization of epoxides by use of an ionic catalyst, carbon dioxide neither inactivates the active species nor becomes a chain transfer agent. Carbon dioxide liquefies easily by compression to several ten atm., and hence could be readily separated from the resulting polymer by reducing the pressure of the polymerization system to atmospheric after completion of the polymerization reaction. Further, in this case, the polymer having such a high molecular weight as to form a solid precipitated in the polymerization vessel in the form of powder or flakes, and hence the taking out the polymer from the polymerization vessel became very easy. In addition, there have been obtained such advantages that in case a relatively low boiling epoxide such as ethylene oxide or propylene oxide is polymerized and a polymer in the form of a liquid having low molecular weight of the epoxide is produced, carbon dioxide as a diluent and the unreacted monomer can be simply separated and removed from the product by maintaining the polymerization system at above the boiling temperature of the monomer used and reducing the system to atmospheric pressure. Thus, by use of carbon dioxide, not only the reaction steps can be simplified but the production costs of polymer can be considerably lowered due to the fact that carbon dioxide is markedly inexpensive as compared with ordinarily employed organic solvents. In addition thereto, there is a practical advantage that such accidents as ignition or explosion or organic compound can be effectively prevented, because a large amount of incombustible carbon dioxide is used.

The carbon dioxide to be used in practicing the procedure of the present invention may suffice with one having a purity of such an extent as seen in the case of commercially available bombed carbon dioxide. The carbon dioxide is charged in a polymerization system by compression. Considering the separation from the resulting polymer, carbon dioxide as a dispersing agent is advantageously used singly. In some cases, however, it may be used in combination with other organic solvents in order to reduce the loss of the latter. As such organic solvents, aliphatic, alicyclic and aromatic hydrocarbons, and ethers may also be adopted. The mixing ratio of carbon dioxide to said organic solvents may be optionally decided within the range of from 10 to 90% by weight. In any case, carbon dioxide is vaporized and is readily recovered by reducing the pressure of the polymerization system to atmospheric. Generally, the amount of carbon dioxide added is from 0.1 to 100, preferably from 2 to 10, by weight ratio to the epoxide compound employed.

Epoxide compounds, to which the method of the present invention is applicable, include alkylene oxides such as ethylene oxide, propylene oxide and butene oxide; halo-substituted alkylene oxides such as epichlorohydrin, epibromohydrin, epifluorohydrin, trifluoromethyl ethylene oxide and vinyl chloride epoxide; mono-epoxy ethers such as hexylglycidyl ether, phenylglycidyl ether and 2-chloroethylglycidyl ether; and such epoxides as styrene oxide, α-methylstyrene oxide, butadiene monoxide and epoxy stearate. These epoxides can be polymerized independently, but may also be copolymerized in admixture of two or more.

Catalysts employed in practicing the method of the present invention are of the ion-type, in general, and examples thereof are as follows: Cationic catalysts such as aluminum trichloride, aluminum bromide, boron fluoride, boron chloride, ferric chloride, tin tetrachloride and titanium tetrachloride. Organometallic compounds such as triethylaluminum, diethyltin and triethylboron; mixtures of organometallic compounds and metal halides, such as a triethylaluminum-ferric chloride mixture and the like; and reaction products of organometallic compounds with water, such as those of triethylaluminum with water, diethyltin with water, and the like. When these coordinated anionic catalysts are used, high molecular weight polymers are obtained, in general. Alkaline earth metal carbonates, which are said to be ring-opening-polymerization catalysts for epoxide compounds, in general, have no polymerization activity in the method of the present invention.

The polymerization temperature to be adopted in practicing the method of the present invention greatly varies depending on the kinds of monomer and catalyst employed, but is within the range of from −80° to 200° C., preferably from −50° to 150° C., in general. Generally, in the case of cationic catalysts, lower temperatures are adopted, while in the case of other catalysts, higher temperatures. The polymerization pressure to be employed is high, because a large amount of liquefied or dissolved carbon dioxide is used, and reaches as high as several hundred atm. particularly when a polymerization temperature above the critical temperature of carbon dioxide is adopted. This is considered ascribable to the fact that as the polymerization progresses, the residual amount of the monomer employed, in which carbon dioxide might have probably been dissolved, reduces to liberate the dissolved carbon dioxide.

The method of the present invention will be fully illustrated with reference to the examples shown below, but it should be construed that the scope of the present invention is not limited thereto. The reduced viscosity shown in each example was calculated from a viscosity measured at 25° C. using a solution of 100 mg. of a polymer in 100 ml. of chloroform in the case of polyethylene oxide, and a solution in 100 ml. of benzene in the case of polypropylene oxide.

EXAMPLE 1

In a 30 ml. stainless-steel high pressure reactor, 200 µl. (167 mg.) of triethylaluminum was added, using a micropipette, and the reactor was tightly closed. These operations were effected in a complete nitrogen atmosphere in order to avoid the contact with air. After evacuating the vessel under cooling with liquid nitrogen, 10 g. of carbon dioxide was introduced from a commercial bomb. Thereafter, 4.5 g. of ethylene oxide was charged by distillation. The thus prepared reactor was allowed to stand in a water bath at 60° C. for 10 hours to react the monomer. After completion of the reaction, the reactor was cooled to room temperature and the valve was opened to discharge unreacted ethylene oxide and carbon dioxide. In the reactor had been left 2.1 g. of a powdery polymer of ethylene oxide. The reduced viscosity of the polymer was 0.6.

EXAMPLE 2

Entirely the same experiment as in Example 1 was carried out, except that a reaction product of 200 µl. of triethylaluminum and 7 µl. of water was used as catalyst, to obtain 2.0 g. of a scale-like polymer of ethylene oxide. The reduced viscosity of the polymer was 2.7.

On the other hand, the same reaction as above was carried out, except that 10 ml. of n-hexane was used in place of the carbon dioxide, to obtain a polymer of ethylene oxide in the form of a mass which had been deposited at the bottom of the reactor. In order to take out the product, benzene was added to dissolve the produce and then diethyl ether was further added to precipitate a polymer. The amount of the polymer thus obtained was 1.8 g.

EXAMPLE 3

Entirely the same reaction as in Example 1 was carried out, except that 100 mg. of aluminum bromide was used as catalyst. After unreacted ethylene oxide and carbon dioxide had been discharged, there was left 4.2 g. of a viscous liquid polymer.

EXAMPLE 4

Entirely the same reaction as in Example 1 was carried out, except that a reaction product of 200 µl. of diethyltin and 18 µl. of water was used as catalyst, to obtain 3.9 g. of a powdery polymer of ethylene oxide having a reduced viscosity of 2.1.

EXAMPLE 5

The same reaction as in Example 1 was carried out, except that 5 ml. of propylene oxide was used as starting material and a reaction product of 200 µl of triethyl-aluminum and 7µl of water as catalyst. After the reaction, unreacted propylene oxide and carbon dioxide were discharged without cooling the reactor, and then the reactor was cooled to obtain 2.7 g. of a powdery polymer of propylene oxide having a reduced viscosity of 2.45.

EXAMPLE 6

Entirely the same reaction as in Example 5 was carried out, except that 5 ml. of styrene oxide was used as starting material. After the reaction, the inner pressure of the reactor was reduced to atmospheric, and then the reactor was evacuated, whereby unreacted styrene oxide was completely removed and 1.6 g. of a powdery polymer of styrene oxide was obtained.

EXAMPLE 7

In entirely the same manner as in Example 1, 4.1 g. of ethylene oxide, 8.1 g. of carbon dioxide and 0.01 g. of tin tetrachloride were charged in an autoclave. The autoclave was immersed in a water bath at 60° C. for 16 hours to react the mixture. After completion of the reaction, unreacted ethylene oxide and carbon dioxide were discharged to obtain 1.5 g. of a polymer of ethylene oxide.

EXAMPLE 8

In entirely the same manners as in Example 7, 6.0 g. of ethylene oxide, 7.2 g. of carbon dioxide and 0.02 g. of titanium tetrachloride were reacted at 60° C. for 6 hours to obtain 0.42 g. of a polymer.

What we claim is:
1. A process comprising polymerizing at least one 1,2-epoxide selected from the group consisting of alkylene epoxide, halo-substituted alkylene epoxides, mono-epoxy ethers, styrene epoxide, methylstyrene oxide, butadiene monoepoxide and epoxy stearate, at a temperature in the range between about −80° C. to about 200° C., at an elevated pressure up to several hundred atmospheres, in the presence of a catalytic amount of an ionic catalyst free of alkaline earth metals and in the presence of liquid carbon dioxide added in an amount of 0.1 to 100 parts by weight per part of epoxide.

2. A process according to claim 1 wherein the carbon dioxide is added in combination with a solvent selected from the group consisting of hydrocarbons and ethers.

3. A process according to claim 1 wherein the epoxide is a member selected from the group consisting of ethylene oxide, propylene oxide, butene oxide, epichlorohydrin, epibromohydrin, epifluorohydrin, trifluoromethyl ethylene oxide, vinyl chloride epoxide, hexylglycidyl ether, phenylglycidyl ether, 2-chloroethylglycidyl ether, styrene oxide, α-methylstyrene oxide, butadiene monoxide and epoxy stearate.

References Cited

UNITED STATES PATENTS 3,100,750    8/1963    Bailey et al.

OTHER REFERENCES

Chemical Abstracts, vol. 63, August 1965 (p. 5771C).

WILLIAM H. SHORT, Primary Examiner

T. PERTILLA, Assistant Examiner

U.S. Cl. X.R.

260—47, 88.3, 611, 615